United States Patent [19]

Gajewski et al.

[11] Patent Number: 5,630,175
[45] Date of Patent: May 13, 1997

[54] SURROUND SOUND SYSTEM FOR GENERAL PURPOSE COMPUTER USING DUAL SOUND CARDS

[75] Inventors: Witold Gajewski, Richmond Hill; Richard M. Helms, Sunderland; Stephen Y. Hon, Scarborough; Peter G. Moogk, Keswick; John V. Taglione, Scarborough, all of Canada

[73] Assignee: International Business Machines Corporation, Armonk, N.Y.

[21] Appl. No.: 428,996

[22] Filed: Apr. 26, 1995

[30] Foreign Application Priority Data

Sep. 23, 1994 [CA] Canada ................. 2132763

[51] Int. Cl.⁶ ............... H01S 5/02; G06F 3/00; G06F 3/16
[52] U.S. Cl. ............ 395/892; 395/2.87; 395/284; 395/681; 381/18
[58] Field of Search ............. 381/17, 63, 5, 381/19, 18; 352/27, 37; 364/724.19, 516 R; 395/892, 882, 889, 872, 2, 2.1, 700, 284, 2.87, 2.79

[56] References Cited

U.S. PATENT DOCUMENTS

| | | | |
|---|---|---|---|
| 5,052,685 | 10/1991 | Lowe et al. | 273/460 |
| 5,297,231 | 3/1994 | Miller | 395/2.1 |
| 5,303,326 | 4/1994 | Dean et al. | 395/2 |
| 5,367,301 | 11/1994 | Stiltner et al. | 341/144 |
| 5,493,547 | 2/1996 | Zampini et al. | 369/48 |

OTHER PUBLICATIONS

Pastrick, Greg "Sound Blaster AWE32: competing on the high end," PC Magazine, v13, n10 p. 54 May 31, 1994.

"Chips: IBM intros Mwave DSP system on a chip for PCs," EDGE: Work–group Computing Report, v5 n212 p. 30 Jun. 13, 1994.

Labriola, Don "3–D sights and sounds," Computer Shopper, v14 n8 p. 766 Aug. 1994.

D. Whittleton and T. Corkerton "A Computer Environment for Surround Sound Programming," IEEE Collogq. No. 230:Workstations Moving into the Studio 1994.

*Primary Examiner*—Thomas C. Lee
*Assistant Examiner*—D. Dinh
*Attorney, Agent, or Firm*—Casimer K. Salys

[57] ABSTRACT

A stereo computer system with resources to produce and record surround sound channels. Such surround sound channels are played or recorded using an audio card added to the computer system, which audio card controls additional speakers and/or microphones. Software for redirecting instructions from existing stereo application programs and sending these instructions to the existing audio device driver and the additional audio device driver is provided. Resources for processing the digital audio data for either extracting surround sound channels from two channel data provided by the application, or for encoding two sets of two channel audio data recorded by the two audio cards is also included.

18 Claims, 2 Drawing Sheets

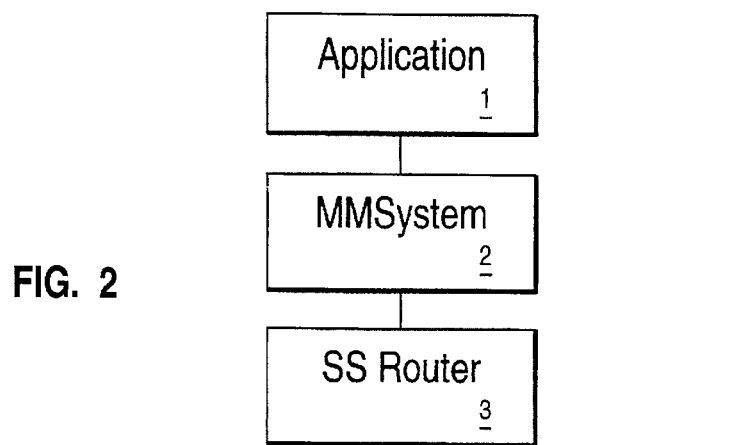

SURROUND SOUND SYSTEM FOR GENERAL PURPOSE COMPUTER USING DUAL SOUND CARDS

FIELD OF THE INVENTION

The present invention pertains to the field of general purpose computer systems which are enabled to provide stereo sound capability.

BACKGROUND OF THE INVENTION

Computer systems which provide stereo sound capability often do so by utilizing an audio card for controlling audio devices (for example, two speakers in conjunction with suitable amplifiers), an audio device driver (also called a sound driver) for controlling the audio card, and an operating system which supports stereo sound, for interacting with both the device driver and stereo application programs.

Typically the application accesses audio data stored in digital form. The application breaks a sound sample into a series of sections of digital audio data, which it stores temporarily in a series of RAM buffers. The device driver, in conjunction with the operating system, loads the contents of these buffers into an internal buffer within the audio card. The audio card in turn contains a CODEC (coder/decoder) facility for converting the data within this buffer into analog form which is then played by the speakers.

The audio card can be added to the computer by means of an expansion slot, or can form part of a personal computer's motherboard.

Typically, the hardware and software described above can also support stereo recording. In such a system, two microphones are attached to the audio card and provide analog audio input, which is digitized by the CODEC Facility. The application sends instructions, using the operating system component, to the sound driver for reading this digitized audio data and copying it to buffers managed by the application for further processing or for long term storage.

Surround sound algorithms are known in the art. These algorithms extract, from two stereo channels (Right and Left), one or more additional channels. The new channels contain the out of phase or ambience information from the original two channels. This ambience information can be obtained by deriving the difference in the signal content between the right and left channels in a stereo system. This ambience information can either be fed through a single rear channel to a single speaker or, to spread the information across the full rear of the sound field, be fed to two rear speakers through two rear channels, with one channel being 180 degrees out of phase with the other.

For example, in a two rear channel implementation, the rear left and rear right channels are produced as follows:

Rear Left=Front Left−Front Right
Rear Right=Front Right−Front Left.

Alternatives, or additional channels, can be used, For example, in one variation of surround sound called concert mode, the signal provided to the rear speaker or speakers can be obtained using the formula Right+Left.

Yet another variation uses a centre front channel obtained according to the formula Right+Left, with the rear channel (s) using the difference information as described previously.

Similarly, surround sound algorithms for encoding multiple channel digital audio data for two channel recording are known in the art.

There exists a need for a simple mechanism for adding surround sound capability to a computer system which is already stereo enabled.

SUMMARY OF THE INVENTION

The invention provides for a method and means for upgrading a computer system which is capable of utilizing software for playing, or recording, digital data representing two channel audio sound, so that the system can produce more than 2 channels of audio output, or record using more than two inputs. In such an upgraded system, existing stereo application programs and operating system software can be utilized, and will function in substantially the same manner as the software does in a two channel system. Thus, the upgraded system will therefore play or record surround sound channels, even though the existing application and operating system software continues to operate as if the computer system was only playing or recording stereo channels.

If the computer system is already equipped with hardware (eg, audio card and audio devices) and controlling software (eg, sound driver for the audio card) for producing two channel audio output, the invention provides for an upgrade path wherein the existing hardware and controlling software is used. In such a system, the existing hardware and software components function in substantially the same manner as they did previously. Additional hardware and controlling software (such as additional audio cards and sound drivers for controlling them) are added for playing or recording the additional channels.

The invention provides software for utilizing the audio data stored in buffers by existing audio applications, processing said data to form surround sound channel data which is stored in additional buffer(s), and for sending instructions to audio card controlling software (eg, sound drivers, also called audio device drivers) as to the buffers which are to be passed to the audio cards for audio output.

According to a broad aspect, the invention provides for a device for use with a general purpose computer which is capable of providing digital data to a stereo sound driver, which comprises means for reading the digital data;

processing means for applying a surround sound algorithm to such digital data; and output means for outputting the processed data.

According to another aspect, the invention provides a method for utilizing a stereo enabled computer system which is designed to run an existing software application for sending instructions and digitized two channel audio data to a first audio card, and for utilizing said system in order to produce more than two channels of audio data comprising the steps of redirecting said instructions to a routing means and from thence to a surround sound creation means and to the first audio card;

processing said data in the surround channel creation means to form surround sound channel data; and passing the surround sound channel data to an additional audio card.

Another aspect of the invention provides a method for utilizing a stereo enabled computer system which is designed to run existing software application for sending instructions to a first audio card for recording and digitizing two channel audio data, and for utilizing said system in order to record more than two channels comprising the steps of redirecting said instructions to a routing means;

sending instructions from said routing means to said first audio card and to at least one additional audio card;

recording on each audio card and converting such recording into digital data;

processing the two channel digital data digitized from each audio card to form a single set of two channel digital data; and returning said single set of digital data to said existing software application.

Yet another aspect of the invention provides for apparatus for use in a stereo enabled computer system having an application which sends instructions to an audio card with respect to forwarding two channel digital data between said application and said audio card, said stereo enabled computer system including at least one additional audio card, said apparatus comprising:

routing means for receiving instructions from said application and in turn sending instructions to said audio cards; and processing means, responsive to whether said instructions are for recording or playback, for processing digital data by calling an appropriate routine, wherein, responsive to recording instructions, said routine encodes digital data produced by said audio cards to form a single set of two channel digital data, and responsive to playback instructions, said routine extracts at least one additional set of two channel digital data from the two channel digital data produced by said application.

Yet another aspect of the invention provides for apparatus for use in a stereo enabled computer system having an application which sends instructions to an audio card with respect to forwarding two channel digital data between said application and said audio card comprising:

at least one additional audio card;

routing means for receiving instructions from said application and in turn sending instructions to said audio card and said additional audio card;

processing means, responsive to whether said instructions are for recording or playback, for processing digital data by calling an appropriate routine, wherein, responsive to recording instructions, said routine encodes digital data produced by said audio card and said additional audio card to form a single set of two channel digital data, and responsive to playback instructions, said routine extracts at least one additional set of two channel digital data from the two channel digital data produced by said application.

Yet another aspect of the invention provides for a method of upgrading a stereo enabled general purpose computer system which is designed to run an existing software application for sending instructions and digitized two channel audio data to a first audio device driver for controlling a first audio card and which has added to it an additional audio card and controlling audio device driver in order to produce surround sound channels comprising the steps of installing a software routing routine for forwarding instructions to at least two locations, said routine includes an operating system interface which emulates the interface of an audio device driver;

updating internal catalog information to redirect communications from said operating system to said software routine; and installing a processing routine for applying a surround sound algorithm to a first set of digital audio data in order to produce surround channel data to be played on said additional audio card;

whereby said software routing routine sends said two channel audio data to said first device driver and said processing routine.

These foregoing aspects of-the invention, together with other aspects and advantages thereof will be more apparent from the following description of the preferred embodiments thereof, taken in conjunction with the following drawings.

BRIEF DESCRIPTION OF THE DRAWINGS

FIG. 2 is a block diagram of the preferred embodiment of the present invention, illustrating the addition of the software and hardware components used to convert the stereo enabled system of FIG. 1 into a surround sound system.

DETAILED DESCRIPTION

Figure 1:
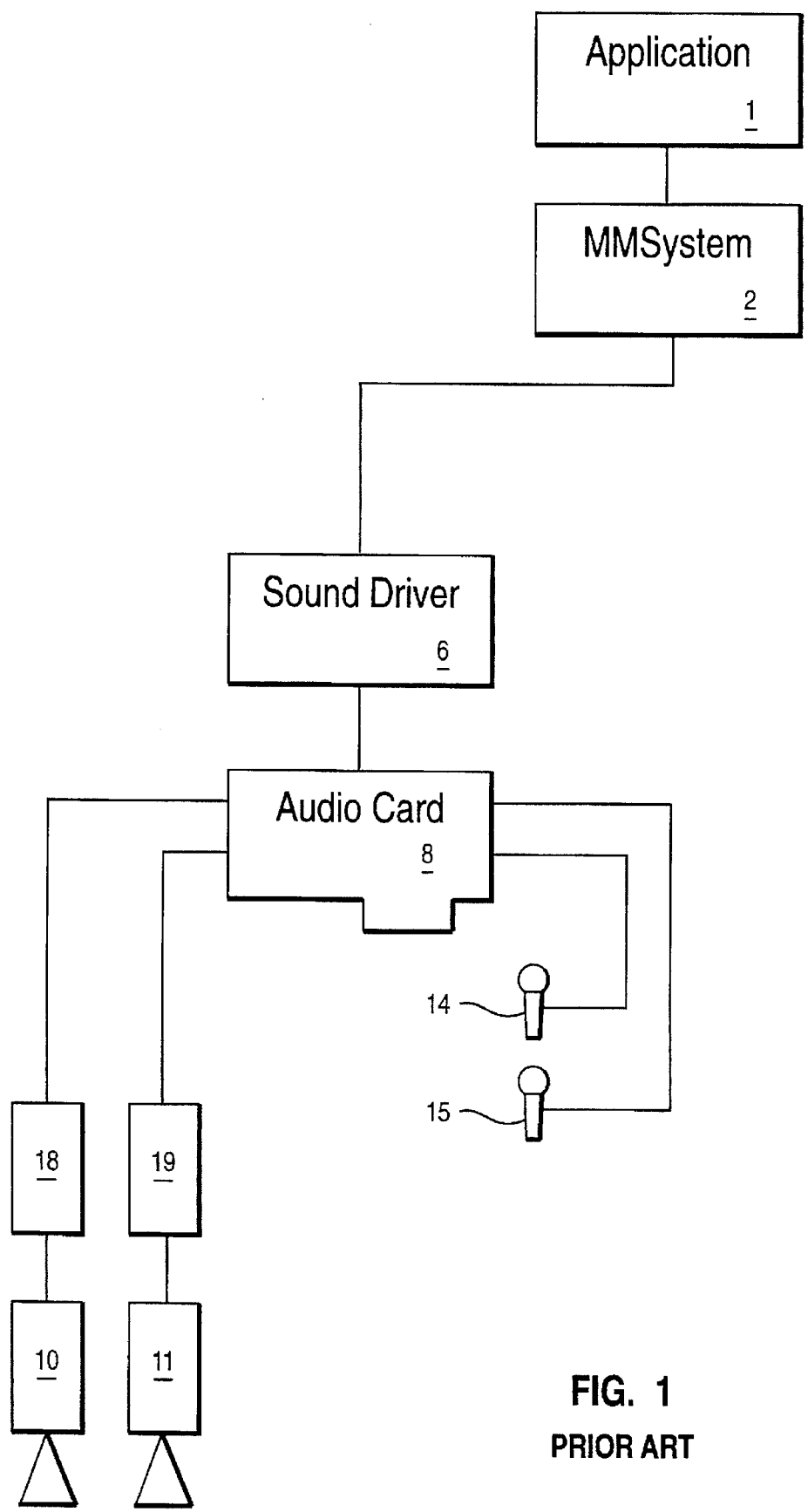
FIG. 1 is a block diagram of a prior art stereo enabled computer system.

FIG. 1 is an example of a contemporary computer system which supports stereo sound. In such a system a suitable stereo producing application program 1 is loaded into the computer's memory. Normally such an application accesses audio data, stored in digital form in a medium such as a hard disk or CD ROM (not shown). The application stores the audio data in a series of ram buffers, for example, buffers A, B and C. It is understood that more or fewer buffers can be used depending on such factors as the size of the size of the audio data file to be played and the size of the available memory.

An operating system component 2 interacts with the application 1 and in turn interacts with a device driver 6, which controls an audio card 8. One example of such an operating system component is the MICROSOFT Windows multimedia system (shown as MMSystem 2 in FIGS. 1 and 2). Other operating system components which provide a defined interface for exchanging data and/or instructions with the application 1, and the device driver 6, could be used.

In one system for providing these interfaces, MMSystem 2 utilizes a configuration file (not shown), which includes an entry for the name of an audio device driver (in FIG. 1, the entry is the name of the sound driver 6). When device driver 6 is installed, an installation program typically adds the entry for the device driver to this configuration file. The MMSystem 2 automatically interfaces with the audio device driver named in its configuration file. Alternatively, the operating system component 2 maintains a table of addresses (not shown) for the device drivers it needs to interact with. The address for any particular device driver (e.g. device driver 6) is stored in this table, and is utilized by the MMSystem 2 in sending instructions to the device driver 6.

Audio card 8 converts digital audio data into analog signals which are amplified, as for example by amplifiers 18 and 19, and then played by speakers 10 and 11. A variety of different audio cards exist for accomplishing this conversion. Each type of audio card has a specific device driver 6 for interacting with the computer's operating system.

Application 1 keeps track of buffer information for each of the buffers in which the application 1 stores audio data. This buffer information includes the ram address for each buffer, as well as the length of each buffer. Other information, such as a flag identifying whether a buffer is in use, could be included.

In operation, application 1 divides a sample of digital data representing sounds to be played into smaller components which it loads into a series of buffers (eg, buffers A, B and C) as hereinbefore described. If the sound sample is larger than the combined size of the buffers maintained by the application, application 1 reuses-the buffers for additional audio data from the sound sample once the contents of the buffers are played, or creates additional buffers. The application determines when any particular buffer should be played and sends playback instructions (which include the buffer information) to the MMSystem 2 for playing the particular buffer accordingly.

The MMSystem 2 in turn instructs device driver 6 to play the contents of a buffer by sending playback instructions (including the buffer information) to the device driver 6. The device driver 6 then interfaces with the audio card 8, and loads an internal buffer (not shown) within the audio card with the contents of the buffer described by the passed buffer information.

A CODEC (coder/decoder) facility (not shown) within the audio card 8 converts the data within this buffer into analog form which is then played by audio devices, for example the speakers 10 and 11. Normally, in order to prevent a break in the sound played by the audio devices 10 and 11, the contents of the next buffer (eg, buffer B) are loaded into the audio card's internal buffer prior to audio card 8 finishes playing the contents of buffer A.

Device driver 6 notifies MMSystem 2 that it is finished with buffer A when the device driver 6 has finished loading audio card 8 with the contents of buffer A. This notification is passed onto the application 1 which then frees buffer A and, if necessary, loads another buffer or reuses buffer A with more audio data from the sound sample. When the MMSystem 2 sends the playback instructions to the device driver 6, the MMSystem 2 also passes information as to how the above described notification should be sent.

Many audio cards, and multimedia applications, as well as the operating software components which support them, are adapted for recording, as well as playback. Optional microphones 14 and 15 are attached to the audio card 8 for this purpose.

In operation, in order to record, the application 1 initializes a series of buffers for recording the audio data. The application 1 then sends recording instructions (which include the buffer information) for filling these buffers, in sequence, with digitized audio data to the operating system component 2. MMSystem 2 then passes this buffer information to the sound driver 6 (based on the name of the audio device driver in its configuration file), along with instructions to fill the buffers with audio data. The device driver 6 then interfaces with the audio card 8, initializing the audio card 8 (if necessary) and instructing it to record.

Audio data is then recorded using microphones 14 and 15, digitized by the CODEC facility, and stored as digital data in the audio card's internal buffer. The device driver 6 then copies the information in this internal buffer to the buffers whose buffer information had been passed to it by the MMSystem 2. The sound driver 6 notifies MMSystem 2 once each buffer is filled. MMSystem 2 in turn notifies the application 1 that each buffer has been filled. The application 1 then normally copies the contents of each buffer to disk and then, if additional data should be recorded, either reuses the buffer or includes different buffer information in its next set of recording instructions sent to the MMSystem 2.

FIG. 2 illustrates an example of the preferred embodiment of the present invention wherein a surround sound system is added to the stereo enabled computer system shown in FIG. 1.

An additional audio card 9 for interfacing with additional audio devices, such as microphones 16 and 17, speaker 12 with associated amplifier 20, and speaker 13 with associated amplifier 21, is added. An additional sound driver 7, for controlling audio card 9 and interfacing with the MMSystem 2, is also added. Device driver 7 and audio card 9 are not required to be the same as device driver 6 and audio card 8.

In FIG. 2, for ease of illustration, it is assumed that speakers 10 and 11, as controlled by audio card 8, play the front left and front right audio channels, whereas audio card 9 and its associated speakers 12 and 13 play the two "surround sound" channels. These surround sound channels can be either rear left and rear right, or rear and centre, depending on the configuration and surround sound algorithm chosen. Of course, this configuration could be reversed with audio card 8 playing the surround sound channels and audio card 9 playing the front channels.

FIG. 2 shows the inclusion of additional software components according to the preferred embodiment of the invention. For ease of illustration, the software is shown to comprise three separate components, namely the surround sound router 3, the surround sound processor (SSprocessor) 5 and an optional front processor 4. These components could of course be combined, or broken down into further subcomponents. In addition, routines located within one of these components could alternatively be moved to another component. For example, for any particular audio card, the SSprocessor 5 and the additional device driver 7 could be combined.

Sound processor 5 uses the 2 channel, stereo audio data which the application has written to the buffers (eg, buffers A, B, and C), and processes this data according to a surround Sound algorithm in order to produce the extra surround sound channels. As stated the front processor 4 is optional, and is only required if any front processing is required. In other words if the sound from the front left and front right channels is to be identical to the sound represented by the left and right channels of the application data, then no front processing is required.

When the surround sound software routines are installed, the operating system component, again illustrated as MMsystem 2, is updated so as to interface with the surround sound router 3, rather than the device driver 6. Assuming the operating system component 2 utilizes a configuration file as discussed above, the software, on installation reads the configuration file for the name of the audio device driver (in this case sound driver 6), and replaces that entry with the surround sound router 3. This causes the MMSystem 2 to interface with the SSRouter 3 rather than interface with device driver 6. Furthermore, the MMSystem 2 will interface in the same manner, so it is important that the surround sound router 3 emulates a device driver with respect to this interface. The sound driver 6 is then added to a configuration file associated with surround sound router 3. Alternatively, if the operating system component 2 uses a table of addresses rather than a configuration file, than the entry which stores the address for device driver 6, is replaced with the address of the surround sound router 3.

Apart from this update, application 1 and MMSystem 2 operate in the same manner as in FIG. 1, implying they function in the same way regardless of whether they are producing surround sound or normal stereo. This facilitates easy installation or upgrade since existing applications and operating system components, as well as existing audio card 8 and associated sound driver 6 do not need to be changed or upgraded in any way (with the exception of small change to the configuration file or address table maintained by the MMSystem 2 as described above).

In operation, application 1 loads a series of buffers (eg, buffers A,B, and C) with digital data representing sounds, and sends playback instructions (including the buffer information) for playing the contents of these buffers to MMSystem 2, in the same manner as described with respect to FIG. 1. The MMSystem 2 in turn sends playback instructions for playing these buffers to the SSRouter 3 in the same manner as it sent the playback instructions to the device driver 6 in FIG. 1.

Upon receipt from MMSystem 2 of the playback instructions (which include the buffer information for the buffers to be played), SSRouter 3 passes said buffer information to the surround sound processor component 5. In addition, SSRouter 3 also passes this buffer information to the front processor component 4, if utilized. Alternatively, if the front processor 4 is not utilized, then the buffer playback instructions are passed directly to device driver 6.

If front processing is required, front processor 4 preferably utilizes another buffer, under control of the front processor 4, for storing the processed data of the original buffer. For example, when buffer information for buffer A is passed to the front processor 4, front processor 4 applies a suitable surround sound algorithm to the data within buffer A, and stores this processed data in buffer A'. By so doing, there is no change to the data in the buffer A. Front processor 4 then passes to the device driver 6 playback instructions (which include the buffer information) for buffer A' (eg. the address and length of buffer A').

In the preferred embodiment of the invention device driver 6 operates in the same manner as discussed with respect to FIG. 1, including sending a notification to the MMSystem 2 once the audio card 8 has finished playing the contents of the buffer. Alternative notification procedures will be discussed below.

When the SSRouter 3 passes the buffer information to the SSprocessor 5, the processor 5 creates a second buffer, for example A", the contents of which are then filled with the contents of the buffer A which have been processed according to the selected surround sound algorithm. Suitable surround sound algorithms for extracting addition channels are known in the art. These algorithms include subtracting the right channel information from the left channel information to form the rear left channel and subtracting the left channel information from the right channel information to form the rear right channel, which can be done with or without delay; or taking the sum/average of these two channels, with or without delay, in order to form either rear left and rear right channels, or rear and centre channels. Delaying the playing of the sound for each channel is achieved by padding buffer A" with blanks. In a preferred embodiment, a separate configuration routine (not shown) could instruct the SSrouter 3 (or alternatively the SSprocessor 5) as to which algorithm to use, the relative volume between the channels, etc., based on the layout of the speakers and the user's preference.

The SSprocessor 5 then sends playback instructions, which include the buffer information for the buffer A", to the second device driver 7. The device driver 7 initializes the audio card 9 (if necessary) and loads the internal buffer of the audio card with the content of this second buffer (e.g. A"). The audio card 9 then converts the digital audio data loaded into its internal buffer into analog signals which are played by speakers 12 and 13.

It is important that device drivers 6 and 7 synchronize the loading of audio cards 8 and 9 respectively, in order to ensure the channels are played together. Therefore, the playback instructions for buffer A (or A' if front processing occurs) are sent to sound driver 6 at the same time as the playback instructions for buffer A" are sent to sound driver 7. Therefore, SSprocessor 5 should not need to finish producing Buffer A" before it passes the address of buffer A" to device driver 7 for loading to the audio card 9. For example, device driver 7 can load the beginning portions of buffer A" into audio card 9 while SSprocessor 5 is still filling subsequent portions of that buffer, in order to match the timing of device driver 6 as driver 6 loads audio card 8. In implementation, A" preferably comprises a series of sub-buffers which are sequentially passed to device driver 7.

Preferably the SSprocessor 5 processes the contents of each buffer, (eg, finish producing buffer A" from the data in buffer A) before device driver 6 sends its notification to the MMSystem 2 (ie. otherwise the application 1 may reuse the buffer before SSprocessor 5 is finished with it). In a less preferred embodiment, device driver 6 could be instructed to notify the router 3, rather than the MMSystem 2, when the device driver 6 has finished with the buffer. Router 3 could then ensure that SSprocessor 5 has finished processing A" (eg, by waiting for a notification from SSprocessor 5), before notifying MMSystem 2.

In the preferred embodiment, the device driver 7 does not send a notification to the MMSystem 2 when the audio card 9 is finished with the buffer. This is unnecessary because, as stated MMSystem 2 functions in the same manner as it did before the surround sound additions were installed. (If necessary, the SSprocessor 5 could send an instruction to the device driver 7 to send the notification to a null address, if the device driver defaults to sending the notification).

Furthermore, although this example illustrates only two additional surround sound channels, the invention can accommodate additional surround sound channels. For example, a fifth channel could be played on a fifth speaker (not shown) connected to amplifier 21 by phase inverting the right rear signal, as is known in the art. If a sixth channel (usually the low frequency (woofer) sounds) is desired, the fifth and sixth channel would require an additional audio card and controlling device driver. In this case, the SSprocessor 5 would extract the additional channels and pass the buffer information to this additional driver. Furthermore a single surround channel could be produced, in which case only one rear speaker is required.

The preferred embodiment of the invention, as illustrated in the example implementation shown in FIG. 2, also supports surround sound recording. In such an operation, the application 1 initializes and manages a series of buffers for accepting digital data representing recorded sounds, as described with respect to FIG. 1. Application 1 sends to the operating system component 2 recording instructions for loading these buffers with digital audio data. These recording instructions include the buffer information for each buffer to be filled. The MMSystem 2 then sends recording instructions (including this buffer information) to the device driver named in its configuration file.

After the software of the present invention has been installed, the entry in the configuration file will now be the SSrouter 3. The MMSystem therefore passes the recording instructions for the buffers (eg, buffer A and then subsequently buffer B etc.) to the SSrouter 3.

The SSrouter 3 then sends recording instructions to the sound driver 6 which in turn sends instructions to the audio card 8 to record sound in the same manner as described with respect to FIG. 1. The device driver 6 then copies the digitized audio data into the buffers managed by the application 1 (eg, buffer A and then B etc).

Simultaneously, the SSrouter 3 sends recording instructions to the additional sound driver 7 to interface with the audio card 9, initializing it (if necessary) and instructing it to record sound. Audio card 9 then records sounds using microphones 16 and 17, which are then digitized by the CODEC facility, and stored as digital data in the audio card's internal buffer. However, in this case, the buffer information included in the recording instructions has been modified, so that SSrouter 3 instructs sound driver 7 to copy the contents into an additional buffer (eg, A"). This buffer A" is set up by SSrouter 3, or alternatively by SSprocessor 5 or by an additional routine (not shown). The contents of audio card 9's internal buffer are then copied by sound driver 7 into this additional buffer (eg, A").

Each sound driver sends a notification to the SSrouter 3 once it has completed loading its respective buffer (eg, A or A", respectively). The sound drivers then proceed to fill the next buffer (eg, buffer B or B"). Meanwhile, the SSrouter 3 instructs the surround sound processor 5 to merge the contents of buffer A and A" using an appropriate surround sound encoding routine. The processed data is then stored in buffer A.

Alternatively, SSrouter 3 (or SSProcessor 4, SSProcessor 5, or an additional routine (not shown), depending on implementation) could establish a different buffer, for example buffer A' for temporarily storing the digital data recorded by audio card 8. The SSrouter 3 then sends recording instructions which include the buffer information for this additional buffer to device driver 6. In this case, device driver 6 loads the contents of the internal buffer of audio card 8 into buffer A'. The surround sound processor 5 then merges the contents of A" and A' into buffer A.

In either embodiment, surround sound processor 5 notifies the SSrouter 3 after storing the processed data into buffer A. SS router 3 in turn notifies the MMSystem 2 that buffer A has been filled. MMSystem 2 then notifies the application 1 that buffer A has been filled and the application then uses the audio data in A, as it would normally.

The configuration shown in FIG. 2 illustrates one embodiment wherein the audio card 9, and attached audio devices are standard off-the-shelf components for producing stereo sound and, as stated could be identical or different from the sound card 8 and related device driver and speakers which are already installed in the computer system. However, as stated, the software routines illustrated by components 3, 4, 5, and even device driver 7 could be implemented in different combinations. For example, an audio card for upgrading a stereo enabled computer could include the SS Processor 5 for applying the surround sound algorithm for extracting the additional channels. In such an embodiment, the SS router 3 would pass the playback instructions directly to a sound driver for controlling such a card. The sound driver would then load the contents of the buffers managed by the application into the card, which would do the processing before converting the processed data into analog signals. In this embodiment, in order to utilized the above described process for recording, the audio card 9 would need access to the data produced by audio card 8 in order for the SSprocessor 5 to merge the two sets of data. One method of implementation involves having the SSrouter 3 instruct device driver 6 to store the data produced by audio card 8 in buffer A' and notify the SSrouter 3 when completed. The SSrouter 3 then passes instructions to audio card 9 (via device driver 7) to merge the contents of buffer A' with the data produced by audio card 9 (eg, buffer A"), as discussed earlier.

It will be apparent that many other changes may be made to the illustrative embodiments, while falling within the scope of the invention and it is intended that all such changes be covered by the claims appended hereto.

We claim:

1. A method for utilizing a stereo enabled computer system which is designed to run existing software application for sending instructions to a first audio card for recording and digitizing two channel audio data, and for utilizing said system in order to record more than two channels, comprising the steps of redirecting said instructions to a routing means;

sending instructions from said routing means to said first audio card and to at least one additional audio card;

recording on each audio card and converting such recording into digital data;

processing the two channel digital data digitized from each audio card to form a single set of two channel digital data; and returning said single set of digital data to said existing software application.

2. The method as claimed in claim 1, wherein said existing application sends said instructions to said first audio card by means of sending said instructions to an operating system which in turns send instructions to a sound driver for controlling said first audio card and wherein said method step of redirecting said instructions comprises the step of redirecting the instructions from said operating system to said routing means and wherein said step of sending instructions to said audio cards comprises the steps of sending instructions to said sound driver and sending instructions to an additional sound driver for controlling said additional audio card.

3. A method for utilizing a stereo enabled computer system which is designed to run an existing software application for sending instructions and digitized two channel audio data to a first audio card, and for utilizing said system in order to produce more than two channels of audio data, comprising the steps of redirecting said instructions to a routing means and from there to a surround sound creation means and to the first audio card;

processing said data in the surround channel creation means to form surround sound channel data; and passing the surround sound channel data to an additional audio card.

4. A method for utilizing an additional audio card and audio devices controlled by said audio card in a stereo enabled computer system running an existing software application for processing two channel digitized audio data and sending instructions to a first audio card, comprising the steps of:

redirecting said instructions to an additional software component;

responsive to playback instructions received by said software component:

processing two channel digitized audio data provided by said application to form surround sound channel data, passing the original two channel audio data to the first audio card, and passing the surround sound channel data to an additional audio card; and responsive to recording instructions received by software component:

sending instructions to said first audio card and to said additional audio card, processing the two channel digital data digitized from each audio card to form a single set of two channel digital data, and returning said single set of digital data to said existing software application.

5. A method of using a stereo sound enabled general purpose computer for producing surround sound, comprising the steps redirecting address information for a set of audio data directed for a first audio device driver to a router;

responsive to receipt of said address information by said router, processing the contents of said set of audio data to produce an additional set of audio data representing surround sound channels extracted from said set of audio data;

directing said address information to said first audio device driver; and directing address information for said additional set of audio data to a second audio device driver.

6. A surround sound audio system for a stereo enabled computer system which has an application for managing buffers for holding digital audio data, a first audio card for converting audio data between analog and digital formats, and at least one additional audio card, said surround sound audio system comprising:

processing means for applying a surround sound algorithm to a set of digital audio data;

router means for receiving recording and playback instructions from said application;

recording means, responsive to recording instructions, comprising:

means for causing said first audio card, and said additional audio cards connected to said computer system, to record, means for causing said processing means to apply a surround sound encoding algorithm to merge audio data digitized by said audio cards to form one set of two channel audio data, and means for storing said merged data in said buffers managed by said application; and playback means, responsive to playback instructions, comprising:

means for directing said processing means to apply a surround sound extraction algorithm to extract surround sound information from one set of two channel audio data stored in said buffers managed by said application, means for sending instructions to said additional audio cards to play said surround sound information, and means for sending instructions to said first audio card to play said two channel audio data, without surround sound information extracted therefrom.

7. A device for use with a general purpose computer which is capable of providing digital data to a stereo sound driver, which comprises:

means for reading the digital data;

means for storing the digital data in a first buffer;

processing means for applying a surround sound algorithm to such digital data;

means for storing data processed by the processing means in a ram buffer; and output means for outputting the processed data by providing the stereo sound driver with buffer information for accessing the first buffer and providing a second sound driver with buffer information for accessing the ram buffer.

8. A device for use with a general purpose computer which is capable of providing a first set of digital data to a stereo sound driver, which comprises:

means for producing at least one additional set of digital data;

means for storing the first set of digital data in a first buffer;

processing means for applying a surround sound algorithm to at least one of said sets of data;

means for storing data processed by the processing means in a ram buffer; and output means for outputting said two sets of data by providing a first sound driver with buffer information for accessing the first buffer and providing a second sound driver with buffer information for accessing the ram buffer.

9. A surround sound audio system for a stereo enabled computer system which has an application for generating buffers of audio data and an audio card for converting digital audio data loaded within an internal buffer into analog signals for driving a pair of speakers, said surround sound audio system comprising:

processing means for applying a surround sound algorithm to the data stored in said buffers of audio data in order to produce surround sound channel data;

means for loading an additional audio card buffer with said surround sound channel data;

first loading means for loading said audio card internal buffer with the contents of the buffers of audio data;

operating system means for interfacing with said application and said first loading means;

router means for receiving instructions from said application and forwarding said instructions to said first loading means and said processing means, said router means emulating said operating system when interfacing with said first loading means and emulating said first loading means when interfacing with said operating system; and means for updating said operating system to interface with said router means.

10. A surround sound audio system for a stereo enabled computer system which has an audio card for converting analog audio data recorded by a pair of microphones into digital audio data and an application for sending instructions to the audio card and generating buffers for receiving digital audio data, said surround sound audio system comprising:

an additional audio card;

means for receiving said instructions and forwarding said instructions to both of said audio cards;

processing means for applying a surround sound encoding algorithm to the digital data produced by both of said audio cards in order to produce a processed set of digital data; and means for loading said buffers with said processed set of digital data.

11. The surround sound audio system as claimed in claim 10 wherein said stereo enabled computer system additionally has a first audio device driver for interfacing with said audio card and operating system means for interfacing with said application and said first audio device driver, and said surround sound audio system further comprises:

an additional audio device driver for interfacing with said additional audio card;

router means for receiving instructions from said application and forwarding said instructions to said first audio device driver and said additional device driver, said router means emulating said operating system when interfacing with said device drivers and emulating said device driver when interfacing with said operating system; and means for updating said operating system to interface with said router means.

12. Apparatus for use in a stereo enabled computer system having an application which sends instructions to an audio card with respect to forwarding two channel digital data between said application and said audio card, said stereo enabled computer system including at least one additional audio card, said apparatus comprising:

routing means for receiving instructions from said application and in turn sending instructions to said audio cards;

responsive to recording instructions, said routine means encoding digital data produced by said audio cards to form a single set of two channel digital data, responsive to playback instructions, said routine means extracting at least one additional set of two channel digital data from the two channel digital data produced by said application; and processing means, responsive to whether said instructions are for recording or playback, for processing digital data by calling an appropriate routine.

13. The device as claimed in claim 12 wherein said routing means is responsive to whether said instructions are for recording or playback and said device further comprises:

means for managing additional buffers;

means for sending playback instructions to said audio card and said processing means, said playback instructions including buffer information for buffers managed by said application;

means for sending recording instructions to said audio card and said additional audio card, wherein the buffer information within the recording instructions sent to said additional card is for said buffers managed by said device;

output means responsive to whether said instructions are for playback or record, for outputting the data processed by said processing means, comprising means for storing the contents of the single set of two channel digital data, produced upon receipt of recording instructions, in the buffers managed by said application; and means for sending playback instructions to said additional card for playing the additional set of two channel digital data produced upon receipt of playback instructions.

14. The apparatus as claimed in claim 13 for the said stereo enabled computer system wherein said application sends said instructions to said audio card by means of an operating system having a defined interface for interfacing with a sound driver for controlling said audio card and wherein an additional sound driver for said additional audio card has been installed, and said apparatus further comprises means for updating said operating system to interface with said routing means instead of said sound driver.

15. The apparatus as claimed in claim 14 wherein said router means emulates the said defined interface between said operating system component and said sound driver, and wherein said device means for sending instructions to said audio cards sends said instructions to the sound drivers associated with said audio cards in such a manner as to emulate the interface between said operating system and said sound driver.

16. Apparatus for use in a stereo enabled computer system having an application which sends instructions to an audio card with respect to forwarding two channel digital data between said application and said audio card, comprising:

at least one additional audio card;

routing means for receiving instructions from said application and in turn sending instructions to said audio card and said additional audio card;

responsive to recording instructions, said routine means encoding digital data produced by said audio card and said additional audio card to form a single set of two channel digital data, responsive to playback instructions, said routine means extracting at least one additional set of two channel digital data from the two channel digital data produced by said application; and processing means, responsive to whether said instructions are for recording or playback, for processing digital data by calling an appropriate routine.

17. The apparatus as claimed in claim 16 wherein said additional audio card includes said processing means.

18. A method of upgrading a stereo enabled general purpose computer system which is designed to run an existing software application for sending instructions and digitized two channel audio data to a first audio device driver for controlling a first audio card and which has added to it an additional audio card and controlling audio device driver in order to produce surround sound channels, comprising the steps of:

installing a software routing routine for forwarding instructions to at least two locations, said routine includes an operating system interface which emulates the interface of an audio device driver;

updating internal catalog information to redirect communications from said operating system to said software routine; and installing a processing routine for applying a surround sound algorithm to a first set of digital audio data in order to produce surround channel data to be played on said additional audio card;

whereby said software routing routine sends said two channel audio data to said first device driver and said processing routine.

* * * * *